United States Patent
Hafner et al.

(10) Patent No.: US 8,276,041 B2
(45) Date of Patent: Sep. 25, 2012

(54) DATA INTEGRITY VALIDATION USING HIERARCHICAL VOLUME MANAGEMENT

(75) Inventors: James Lee Hafner, San Jose, CA (US); Wendy Ann Belluomini, San Jose, CA (US); Douglas William Dewey, Tuscson, AZ (US); Brian D. McKean, Longmont, CO (US); Donald R. Humlicek, Wichita, KS (US); Kevin L. Kidney, Lafayette, CO (US); Theresa L. Segura, Broomfield, CO (US)

(73) Assignee: International Business Machines Corporation, Armonk, NY (US)

( * ) Notice: Subject to any disclaimer, the term of this patent is extended or adjusted under 35 U.S.C. 154(b) by 987 days.

(21) Appl. No.: 12/269,123

(22) Filed: Nov. 12, 2008

(65) Prior Publication Data

US 2010/0122055 A1    May 13, 2010

(51) Int. Cl.
*G11C 29/00* (2006.01)
(52) U.S. Cl. .................. 714/763; 714/718; 714/722
(58) Field of Classification Search .............. 714/763, 714/710, 718, 719, 722; 711/161, 162
See application file for complete search history.

(56) References Cited

U.S. PATENT DOCUMENTS
7,899,788 B2 * 3/2011 Chandhok et al. ............ 707/640
* cited by examiner

*Primary Examiner* — Fritz Alphonse
(74) *Attorney, Agent, or Firm* — Century IP Group, Inc.; F. Jason Far-hadian, Esq.

(57) ABSTRACT

A method for reading data from a data storage system is provided. The method comprises requesting a virtual data volume to access data from one or more data blocks in the data storage system; requesting a virtual protection information volume to access protection information associated with the data blocks; validating the data using the protection information; and providing the data to the host interface, in response to successful validation of the data. A method for writing data to a data storage system is also provided. The method comprises receiving data to be written to one or more data blocks in the data storage system, wherein the data is stored in a cache; generating protection information to be stored on a virtual protection information volume; requesting a virtual data volume to update the data blocks with the data; and requesting the virtual protection information volume to store the protection information.

18 Claims, 7 Drawing Sheets

US 8,276,041 B2

DATA INTEGRITY VALIDATION USING HIERARCHICAL VOLUME MANAGEMENT

CROSS-REFERENCE TO RELATED APPLICATIONS

Pursuant to 35 U.S.C. § 120 and 37 CFR 1.78, this application is a continuation-in-part of, and claims the benefit of earlier filing date and right of priority to U.S. patent application Ser. No. 11/860,461, filed on Sep. 24, 2007, and U.S. patent application Ser. No. 12/246,195, filed on Oct. 6, 2008, the contents of which are hereby incorporated by reference herein in its entirety.

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present invention relates generally to data storage systems and, more particularly, to data integrity validation.

BACKGROUND

Storing and retrieving data from large capacity storage systems (e.g., systems with a plurality of disk drives) generally requires certain safeguards against data corruption to ensure data integrity and system reliability.

U.S. patent application Ser. No. 11/860,461 discloses features for protecting user data in a storage system. Protection information, including version numbers for a set of user data blocks, is generated for validating data. The protection information is then embedded with the data and copied over to a separate volume that uses low latency non-volatile storage such as flash memory or solid state drives.

Systems and methods are needed to implement the above-mentioned features into an existing architecture of a storage controller.

SUMMARY

The present disclosure is directed to systems, methods and corresponding products that facilitate data integrity validation using hierarchical volume management.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for reading data from data blocks in a data storage system is provided. The method comprises requesting a virtual data volume to access data from one or more data blocks in the data storage system, in response to receiving a read request from a host interface; requesting a virtual protection information volume to access protection information associated with the data blocks, wherein the protection information is stored on the virtual protection information volume; validating the data using the protection information; and providing the data to the host interface, in response to successful validation of the data.

In accordance with one embodiment, a method for writing data to data blocks in a data storage system is provided. The method comprises receiving data to be written to one or more data blocks in the data storage system from a host interface, wherein the data is stored in a cache; generating protection information to be stored on a virtual protection information volume; requesting a virtual data volume to update the data blocks with the data; and requesting the virtual protection information volume to store the protection information.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXAMPLE EMBODIMENTS

Figure 1:
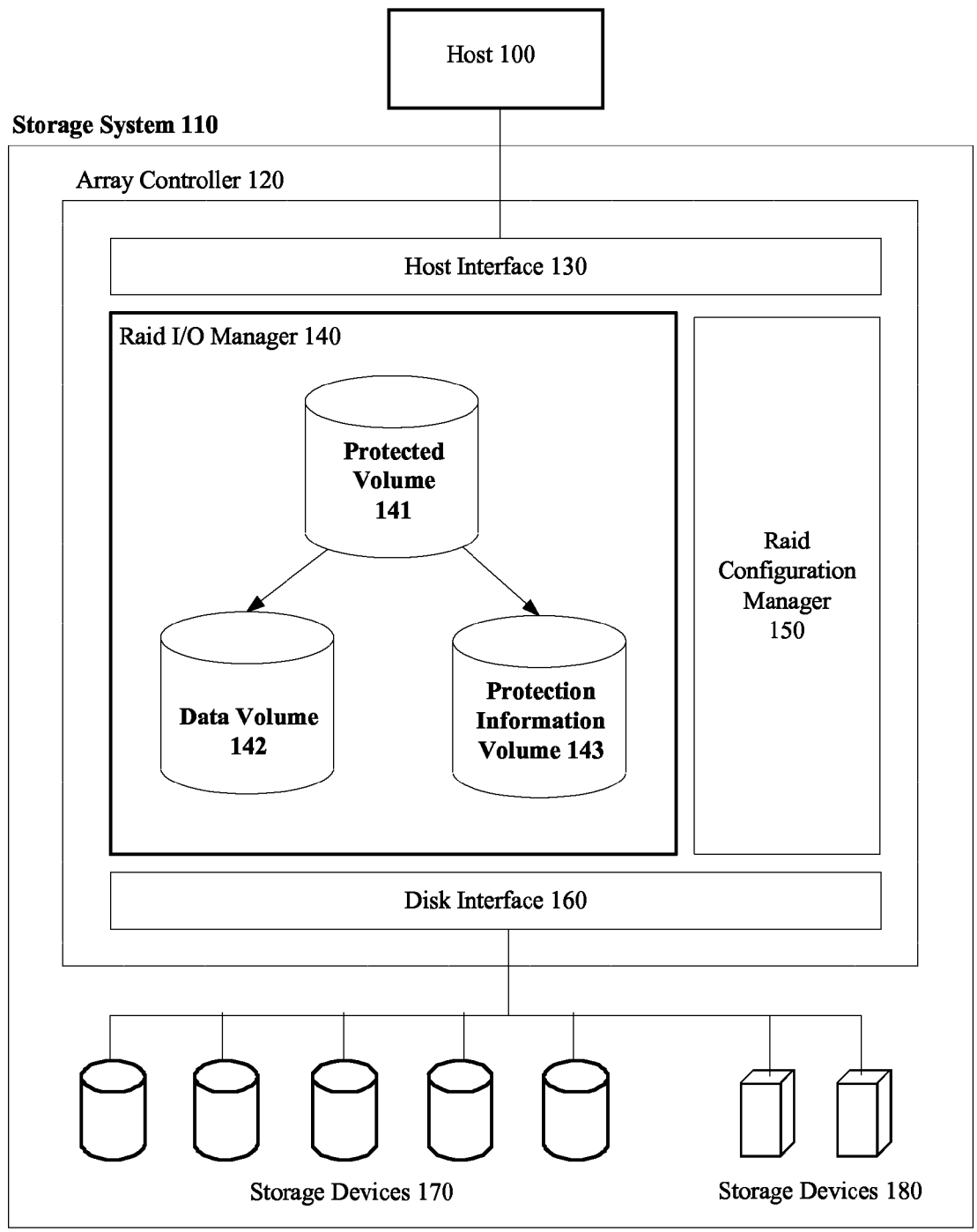
FIG. 1 is a block diagram of an exemplary storage environment, in accordance with one embodiment.

The present disclosure is directed to systems and corresponding methods that facilitate data integrity validation using hierarchical volume management.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

By way of example, certain embodiments are disclosed herein as applicable to a Redundant Array of Independent Disks (RAID) architecture. It should be noted, however, that such exemplary embodiments should not be construed as limiting the scope of the invention to a RAID implementation. The principles and advantages disclosed herein may be equally applicable to other data storage environments.

U.S. patent application Ser. No. 12/246,195 discloses systems and methods that implement the above-mentioned features using a proxy disk virtualization layer below a RAID volume. The systems and methods provided herein also implement the above-mentioned features, but with minimal impact to software architecture and controller performance Referring to FIG. 1, in accordance with one embodiment, an exemplary storage environment is provided. Storage system 110 comprises an array controller 120, one or more storage devices 170, and one or more storage devices 180. Array controller 120 comprises a host interface 130 for communicating with host 100, a RAID input/output (I/O) manager 140 for servicing I/O requests received from host 100, a RAID configuration manager 150 for configuring RAID volumes on storage devices 170 and storage devices 180, and a disk interface 160 for communicating with storage devices 170 and 180.

Storage devices 170 stores data received from host 100 along with protection information embedded with the data. Storage devices 180 comprise one or more storage devices for storing protection information separately from the data.

RAID I/O manager 140 comprises a protected volume 141, a data volume 142, and a protection information volume 143. These three virtual volumes implement a multilevel volume hierarchy for protecting data stored in storage system 110. Protected volume 141 maps data received from host 100 into data volume 142 and stores protection information generated for validating the data on protection information volume 143.

Data volume 142 and protection information volume 143 are managed by RAID I/O manager 140 and RAID configuration manager 150 according to their respective RAID properties. In an exemplary embodiment, data volume 142 may be a RAID5 volume using Fibre Channel hard disk drives, for example, and protection information volume 143 may be a RAID1 volume using high speed solid state dries also using a Fibre Channel interface, for example.

Figure 2:
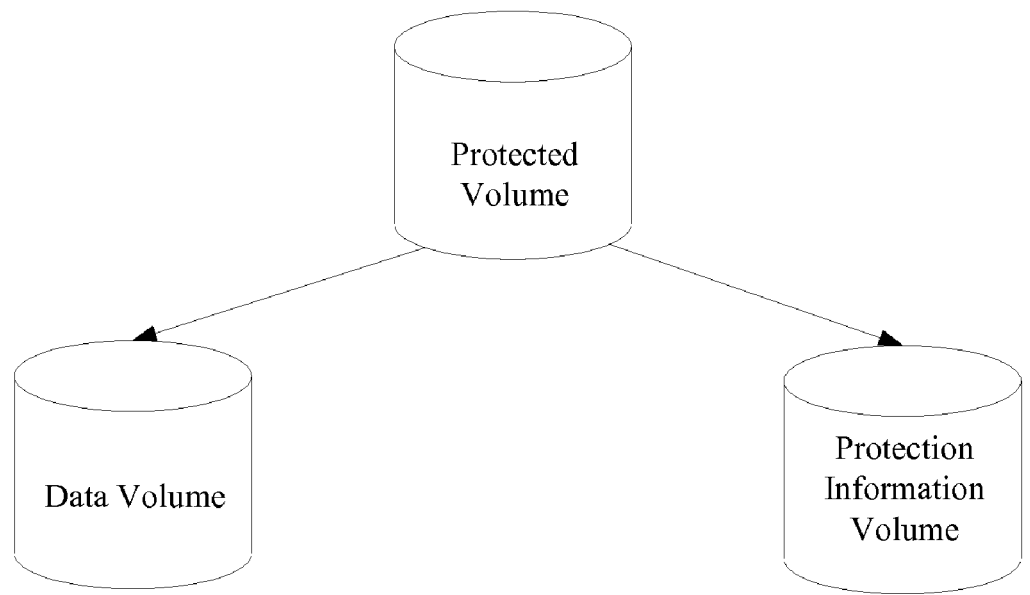
FIG. 2 illustrates layout of data and protection information, with embedding, in accordance with one embodiment.
Figure 2:
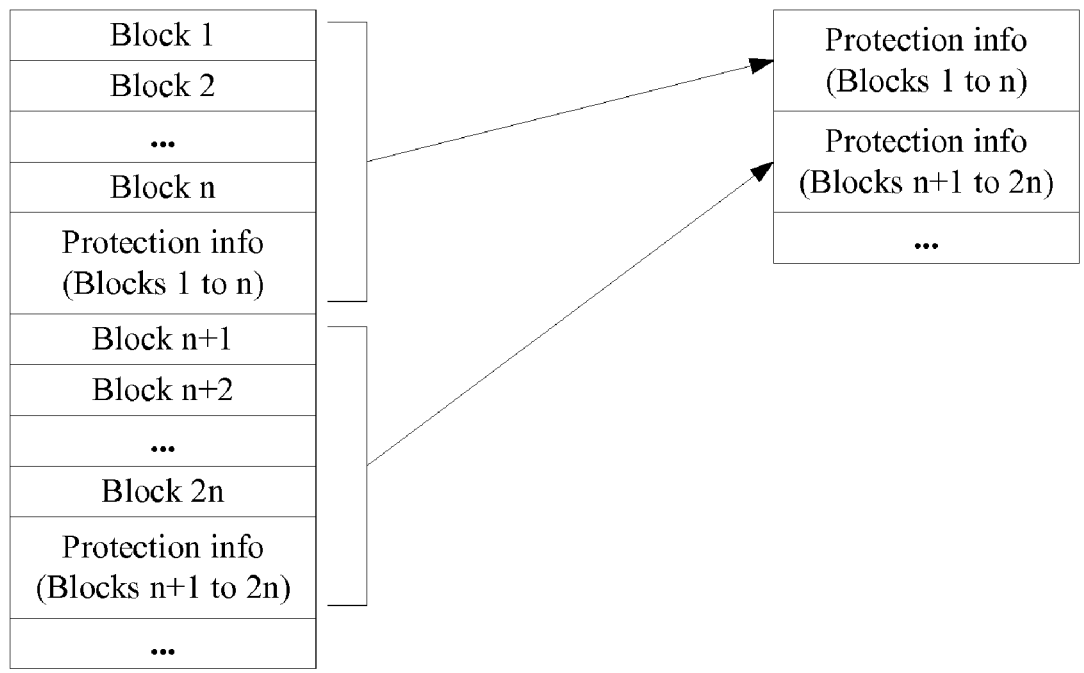

Referring to FIGS. 1 and 2, in accordance with one embodiment, data layouts of data volume 142 and protection information volume 143 are provided. In data volume 142, each grouping of n data blocks includes embedded protection information for the n data blocks. For example, a first group of data blocks comprises block 1, block 2, . . . , block n, and protection information for blocks 1 to n; and a second group of data blocks comprises block n+1, block n+2, . . . , block 2n, and protection information for blocks n+1 to 2n. It is also possible to store protection information for each data block (e.g., n=1).

Protection information volume 143 comprises a block of protection information for each group of n data blocks in data volume 142. For example, protection information for blocks 1 to n of data volume 142 is stored on block 1 of protection information volume 143, and protection information for blocks n+1 to 2n of data volume 142 is stored on block 2 of protection information volume 143. It is noteworthy that a block of protection information may correspond to a physical or logical sector or to a smaller or larger unit of storage on protection information volume 143.

Figure 3:
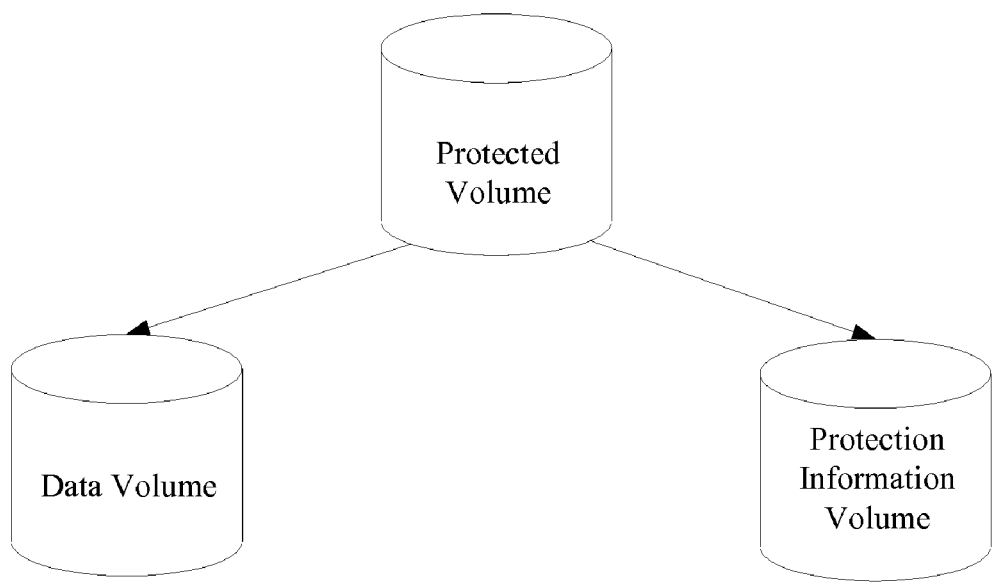
FIG. 3 illustrates layout of data and protection information, without embedding, in accordance with one embodiment.
Figure 3:
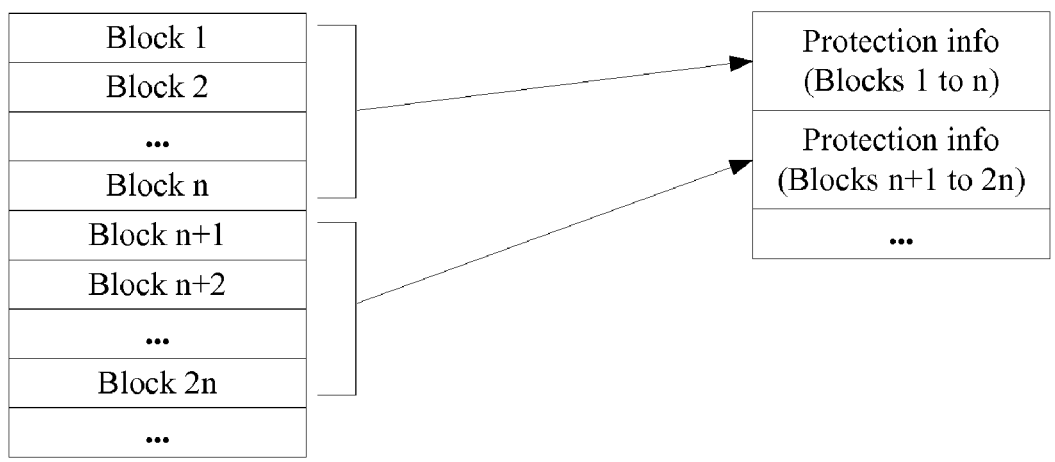

Referring to FIGS. 1 and 3, in accordance with an alternative embodiment, data volume 142 may not comprise embedded protection information, and cyclic redundancy check (CRC), checksum, or other value for validating data may be included in protection information stored on protection information volume 143.

Advantageously, no version number is necessary because the match between the data and the protection information implicitly verifies the version of the protection information. The CRC, checksum, or other value for validating data is derived from the content of the data itself, so if the data changes, the value also changes. Version numbers verify the container of the data (e.g., by identifying when the data was written); the CRC, checksum, or other value verifies the data itself.

Figure 4:
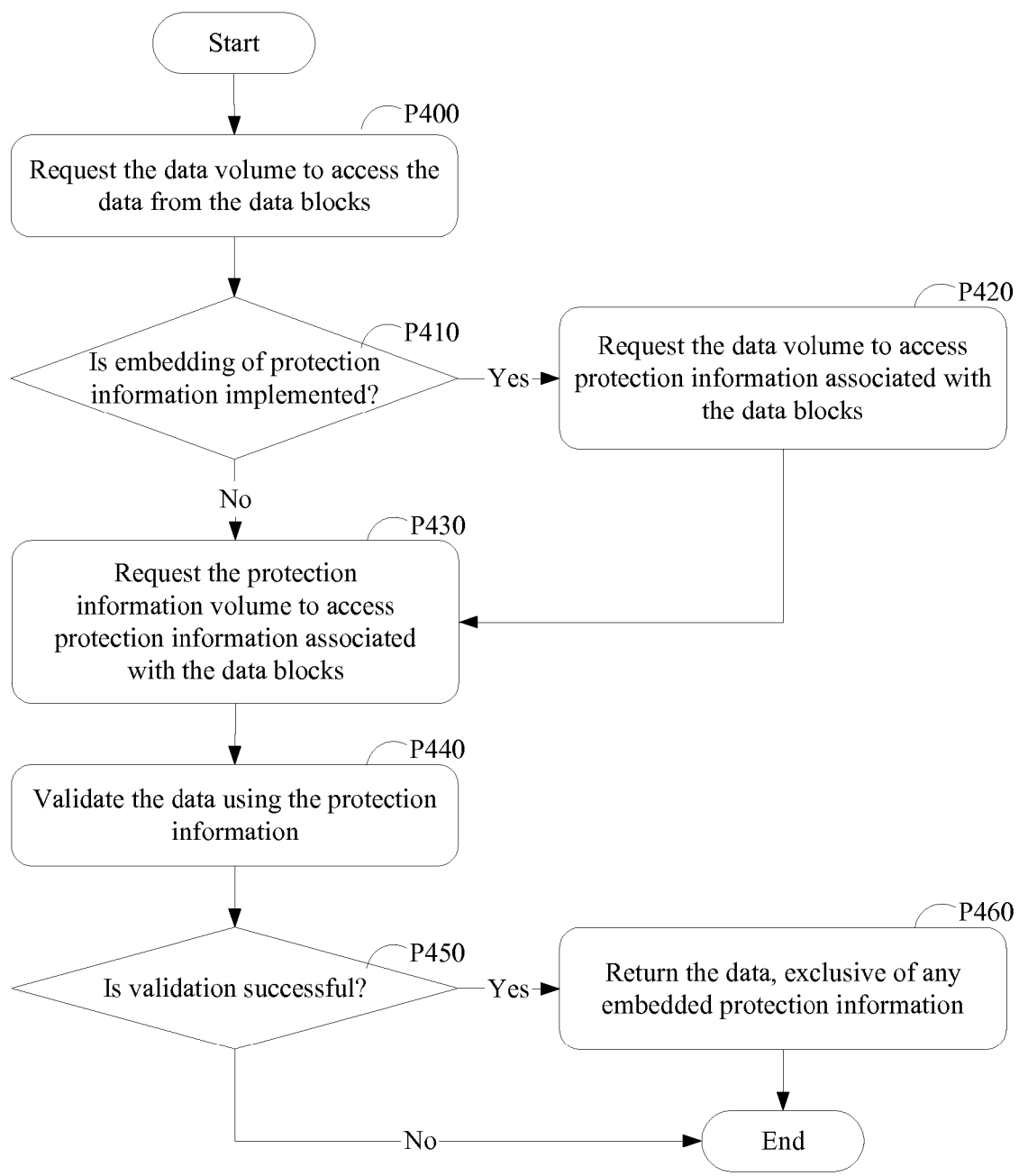
FIG. 4 is a flow diagram of a method for reading data from data blocks, in accordance with one embodiment.

Referring to FIGS. 1 and 4, in accordance with one embodiment, RAID I/O manager 140 receives, from host 100, a request to read data from data blocks on protected volume 141, wherein the actual data blocks are stored on storage devices 170. Upon receiving the request, protected volume 141 requests data volume 142 to access the data from the data blocks (P400). If embedding of protection information is implemented (P410), protected volume 141 requests data volume 142 to access protection information associated with the data blocks (P420).

Regardless of whether embedding of protection information is implemented (P410), protected volume 141 requests protection information volume 143 to access protection information associated with the data blocks (P430) and validates the data using the protection information and any embedded protection information (P440). Upon successful validation (P450), protected volume 141 returns the data, exclusive of any embedded protection information (P460).

Figure 5:
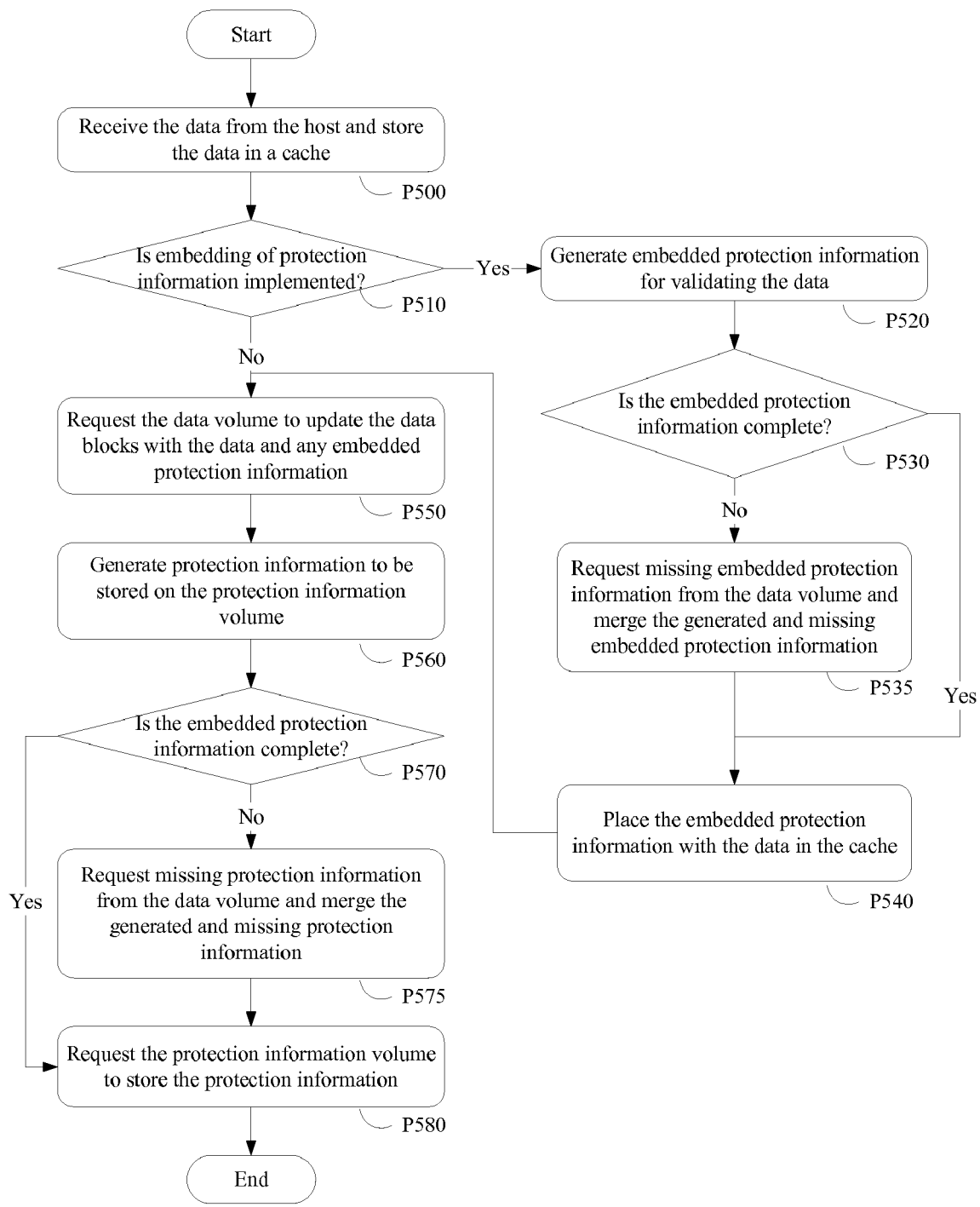
FIG. 5 is a flow diagram of a method for writing data to data blocks, in accordance with one embodiment.

Referring to FIGS. 1 and 5, in accordance with one embodiment, RAID I/O manager 140 receives, from host 100, a request to write data to data blocks from protected volume 141, wherein the actual data blocks are stored on storage devices 170. In response to receiving the request, protected volume 141 receives the data from host 100 and stores the data in a cache (not shown) (P500).

If embedding of protection information is implemented (P510), protected volume 141 generates embedded protection information for validating the data (P520). If the generated embedded protection information is incomplete (P530), protected volume 141 requests missing embedded protection information from data volume 142 and merges the generated and missing embedded protection information (P535). Protection information is incomplete, for example, if the protection information does not fill a complete minimal I/O unit of protected information volume 143. Upon determining that the embedded protection information is complete (P530), protected volume 141 stores the embedded protection information with the data in the cache (P540).

Regardless of whether embedding is implemented (P510), protected volume 141 requests data volume 142 to update the data blocks with the data and any embedded protection information stored in the cache (P550). Protected volume 141 also generates protection information to store on protection information 143 (P560). If the generated protection information is incomplete (P570), protected volume 141 requests missing protection information from protection information volume 143 and merges the generated and missing protection information (P575). Upon determining that the protection information is complete (P570), protected volume 141 requests protection information volume 143 to store the protection information (P580).

Any operations internal to either data volume 142 or protection information volume 143 are coordinated by protected volume 141. For example, if a write request from protected volume 141 (e.g., P580) causes data volume 142 to read data as part of a read-modify write implementation, data volume 142 first requests protected volume 141 to validate the data using associated protection information from protection information volume 143.

In different embodiments, the invention may be implemented either entirely in the form of hardware or entirely in the form of software, or a combination of both hardware and software elements. For example, storage system 110 may be comprised in a controlled computing system environment that can be presented largely in terms of hardware components and software code executed to perform processes that achieve the results contemplated by the system of the present invention.

Figure 6:
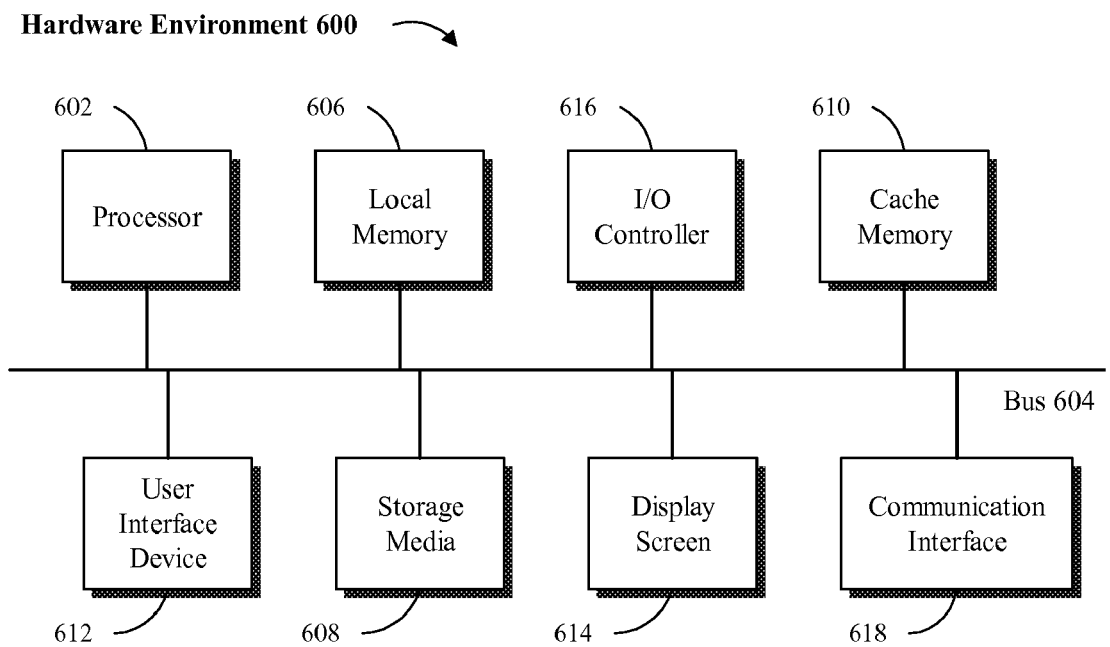
FIGS. 6 and 7 are block diagrams of hardware and software environments in which a system of the present invention may operate, in accordance with one or more embodiments.
Figure 7:
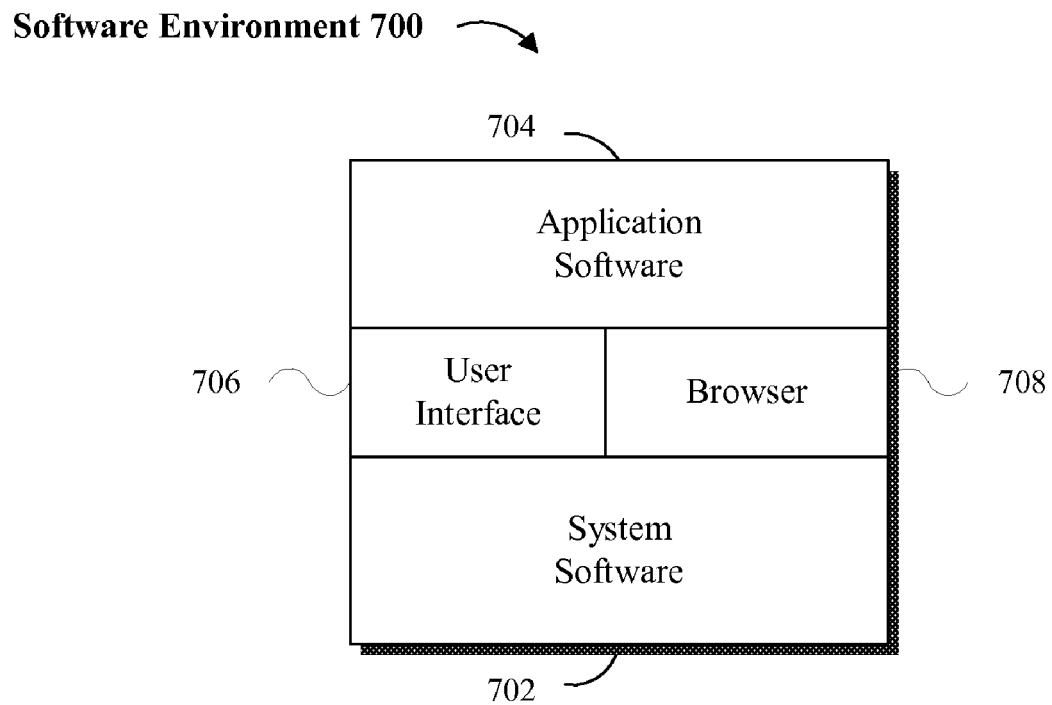

Referring to FIGS. 6 and 7, a computing system environment in accordance with an exemplary embodiment is composed of a hardware environment 600 and a software environment 700. The hardware environment 600 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 700 is divided into two major classes comprising system software 702 and application software 704. System software 702 comprises control programs, such as the operating system (OS) and information management systems that instruct the hardware how to function and process information.

In one embodiment, processes provided above may be implemented as system software 702 or application software 704 executed on one or more hardware environments to facilitate data integrity validation using hierarchical volume management. Application software 704 may comprise but is not limited to program code, data structures, firmware, resident software, microcode, or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Referring to FIG. 6, an embodiment of the system software 702 and application software 704 can be implemented as computer software in the form of computer readable code executed on a data processing system such as hardware environment 600 that comprises a processor 602 coupled to one or more computer readable media or memory elements by way of a system bus 604. The computer readable media or the memory elements, for example, may comprise local memory 606, storage media 608, and cache memory 610. Processor 602 loads executable code from storage media 608 to local memory 606. Cache memory 610 provides temporary storage to reduce the number of times code is loaded from storage media 608 for execution.

A user interface device 612 (e.g., keyboard, pointing device, etc.) and a display screen 614 can be coupled to the computing system either directly or through an intervening I/O controller 616, for example. A communication interface unit 618, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 600 may not include all the above components, or may comprise other components for additional functionality or utility. For example, hardware environment 600 may be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In certain embodiments of the system, communication interface 618 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 7, system software 702 and application software 704 may comprise one or more computer programs that are executed on top of an operating system after being loaded from storage media 608 into local memory 606. In a client-server architecture, application software 704 may comprise client software and server software.

Software environment 700 may also comprise browser software 708 for accessing data available over local or remote computing networks. Further, software environment 700 may comprise a user interface 706 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

Therefore, it should be understood that the invention may be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method executed on one or more processors for reading data from data blocks in a data storage system, the method comprising:
   requesting a virtual data volume to access data from one or more data blocks in the data storage system, in response to receiving a read request from a host interface;
   requesting a virtual protection information volume to access protection information associated with the data blocks, wherein the protection information is stored on the virtual protection information volume;
   validating the data using the protection information; and
   providing the data to the host interface, in response to successful validation of the data.

2. The method of claim 1, wherein additional protection information is embedded in association with the data on the virtual data volume, the method further comprising:
   requesting the virtual data volume to access the embedded protection information, along with the data, from the data blocks; and
   validating the data using the embedded protection information,
   wherein the data is returned, exclusive of the embedded protection information.

3. A method executed on one or more processors for writing data to data blocks in a data storage system, the method comprising:
   receiving data to be written to one or more data blocks in the data storage system from a host interface, wherein the data is stored in a cache;
   generating protection information to be stored on a virtual protection information volume;
   requesting a virtual data volume to update the data blocks with the data; and
   requesting the virtual protection information volume to store the protection information.

4. The method of claim 3, wherein the protection information is incomplete, further comprising:
   requesting missing protection information from the virtual protection information volume; and
   merging the missing protection information with the protection information, so that the protection information is complete.

5. The method of claim 3, further comprising:
   generating embedded protection information for validating the data, wherein the embedded protection information is stored with the data in the cache; and
   requesting the virtual data volume to update the data blocks with the data and the embedded protection information.

6. The method of claim 5, wherein the embedded protection information is incomplete, further comprising:
   requesting missing embedded protection information from the virtual data volume; and
   merging the missing embedded protection information with the embedded protection information, so that the embedded protection information is complete.

7. A system for reading data from data blocks in a data storage system having one or more data storage mediums, the system comprising:
   a logic unit for requesting a virtual data volume to access first data from one or more first data blocks in the data storage system, in response to receiving a read request from a host interface;
   a logic unit for requesting a virtual protection information volume to access first protection information associated with the first data blocks, wherein the first protection information is stored on the virtual protection information volume;
   a logic unit for validating the first data using the first protection information; and
   a logic unit for providing the first data to the host interface, in response to successful validation of the first data.

8. The system of claim 7, wherein additional protection information is embedded in association with the first data on the virtual data volume, the system further comprising:
   a logic unit for requesting the virtual data volume to access the first embedded protection information, along with the first data, from the first data blocks; and
   a logic unit for validating the first data using the first embedded protection information,
   wherein the first data is returned, exclusive of the first embedded protection information.

9. The system of claim 7, wherein data is written to data blocks in the data storage system, the system comprising:
   a logic unit for receiving second data to be written to one or more second data blocks in the data storage system from the host interface, wherein the second data is stored in a cache;
   a logic unit for generating second protection information to be stored on the virtual protection information volume;
   a logic unit for requesting the virtual data volume to update the second data blocks with the second data; and
   a logic unit for requesting the virtual protection information volume to store the second protection information.

10. The system of claim 9, wherein the second protection information is incomplete, further comprising:
    a logic unit for requesting missing protection information from the virtual protection information volume; and
    a logic unit for merging the missing protection information with the second protection information, so that the second protection information is complete.

11. The system of claim 9, further comprising:
    a logic unit for generating second embedded protection information for validating the second data, wherein the second embedded protection information is stored with the second data in the cache; and
    a logic unit for requesting the virtual data volume to update the second data blocks with the second data and the second embedded protection information.

12. The system of claim 11, wherein the second embedded protection information is incomplete, further comprising:
    a logic unit for requesting missing embedded protection information from the virtual data volume; and
    a logic unit for merging the missing embedded protection information with the second embedded protection information, so that the second embedded protection information is complete.

13. A computer program product comprising a non-transitory data storage medium having a computer readable program, wherein the computer readable program when executed on a computer causes the computer to:
   request a virtual data volume to access first data from one or more first data blocks in a data storage system, in response to receiving a read request from a host interface;

request a virtual protection information volume to access first protection information associated with the first data blocks, wherein the first protection information is stored on the virtual protection information volume;

validate the first data using the first protection information; and providing the first data to the host interface, in response to successful validation of the first data.

14. The computer program product of claim 13, wherein the computer readable program when executed on a computer further causes the computer to:

request the virtual data volume to access first embedded protection information, along with the first data, from the first data blocks; and validate the first data using the first embedded protection information, wherein the first data is returned, exclusive of the first embedded protection information.

15. The computer program product of claim 13, wherein the computer readable program when executed on a computer further causes the computer to:

receive second data to be written to one or more data blocks in the data storage system from the host interface, wherein the second data is stored in a cache;

generate second protection information to be stored on the virtual protection information volume;

request the virtual data volume to update second data blocks with the second data; and request the virtual protection information volume to store the second protection information.

16. The computer program product of claim 15, wherein the computer readable program when executed on a computer further causes the computer to:

request missing protection information from the virtual protection information volume; and merge the missing protection information with the second protection information, so that the second protection information is complete.

17. The computer program product of claim 15, wherein the computer readable program when executed on a computer further causes the computer to:

generate second embedded protection information for validating the second data, wherein the second embedded protection information is stored with the second data in the cache; and request the virtual data volume to update the second data blocks with the second data and the second embedded protection information.

18. The computer program product of claim 17, wherein the computer readable program when executed on a computer further causes the computer to:

request missing embedded protection information from the virtual data volume; and merge the missing embedded protection information with the second embedded protection information, so that the second embedded protection information is complete.

* * * * *